United States Patent
Ishii et al.

(10) Patent No.: US 8,290,764 B2
(45) Date of Patent: Oct. 16, 2012

(54) VIRTUALIZATION PROGRAM, SIMULATION APPARATUS AND VIRTUALIZATION METHOD

(75) Inventors: Shogo Ishii, Tokyo (JP); Koji Yura, Tokyo (JP)

(73) Assignee: Toshiba Solutions Corporation, Tokyo (JP)

( * ) Notice: Subject to any disclaimer, the term of this patent is extended or adjusted under 35 U.S.C. 154(b) by 856 days.

(21) Appl. No.: 12/341,902

(22) Filed: Dec. 22, 2008

(65) Prior Publication Data
US 2009/0171652 A1  Jul. 2, 2009

(30) Foreign Application Priority Data
Dec. 27, 2007  (JP) .................................. 2007-335724

(51) Int. Cl.
G06F 9/455   (2006.01)
(52) U.S. Cl. ........................................................ 703/27
(58) Field of Classification Search ...................... 703/27
See application file for complete search history.

(56) References Cited

U.S. PATENT DOCUMENTS

| 6,672,963 | B1 * | 1/2004 | Link ................................. | 463/43 |
| 2007/0136733 | A1 * | 6/2007 | Park et al. ....................... | 718/108 |
| 2010/0287360 | A1 * | 11/2010 | Maruyama ...................... | 712/225 |
| 2010/0325397 | A1 * | 12/2010 | Craske ............................ | 712/222 |

FOREIGN PATENT DOCUMENTS

| JP | 11-219301 | 8/1999 |
| JP | 2000-066904 | 3/2000 |
| JP | 2004-234528 | 8/2004 |
| JP | 2005-293219 | 10/2005 |

OTHER PUBLICATIONS

Chinese Office Action for Application No. 200810190683.6 mailed on Apr. 26, 2011.
Japanese Office Action for application No. 2007-335724 mailed on Jul. 26, 2011.

\* cited by examiner

*Primary Examiner* — Dwin M Craig
*Assistant Examiner* — Andre Pierre Louis
(74) *Attorney, Agent, or Firm* — Turocy & Watson, LLP (57) ABSTRACT

A virtualization program for being able to execute a simulation at high speed, allows a native code simulator to have a stack specific to each task that is managed by a multitask OS. Processes of creation, save, restoration and erasure of a context that a target CPU executes by means of a special control register operation is executed by an API provided by the native code simulator. When porting the multitask OS, the source code is altered so as to call the API. A stack specific to a task is assigned at the API and the stack is switched for switching the task to make context switching possible.

3 Claims, 5 Drawing Sheets

FUNCTION STRUCTURE OF TASK 14A (CONTEXT CREATION)

RELATIONSHIP OF STACK REGION, TCB

FIG. 4

FUNCTION STRUCTURE OF TASK 14A (CONTEXT PRESERVATION)

RELATIONSHIP OF STACK REGION, TCB

FIG. 5

FUNCTION STRUCTURE OF TASK 14A (CONTEXT UPDATE)

STACK REGION

VIRTUALIZATION PROGRAM, SIMULATION APPARATUS AND VIRTUALIZATION METHOD

BACKGROUND OF THE INVENTION

1. Field of the Invention

The present invention relates to a virtualization program, a simulation apparatus and a virtualization method for simulating a multi-task generated on a target OS (Operating System) by means of the native code of a host CPU in a simulation of software including an OS capable of operating for multi-task processing.

2. Description of the Related Art

ISS (Instruction Set Simulation) and native code simulation are known as general computer simulation techniques.

With ISS, a task of the binary code that conforms to the architecture of a target CPU (the CPU of a computer that is the subject of simulation) is interpreted at the time of execution and simulated. With ISS, the simulation of the task takes a long time and hence entire software including the OS cannot be simulated within a realistic time span. With native code simulation, on the other hand, a task of the binary code that conforms to the architecture of a host CPU (the processor of the computer that executes the simulation) is directly executed by the host CPU and hence the task does not need to be interpreted and converted to the binary code that conforms to the architecture of a target CPU so that the simulation can be executed at high speed.

When the target OS (an OS that is the subject of simulation operating on a target CPU) is a multitask OS, the target OS preserves and restores the context of a task by operating a special control register such as the stack register or the PSR (Program Status Register) that the target CPU has to realize context switching for a multitask. The operations of those special control registers are described in the assembler language.

Of the conventional art relating to the present invention, hardware/software cooperative verification methods that can realize a high speed simulation, which is a C-based native code simulation, without degrading the accuracy of timing verification, are disclosed (refer to, e.g., Patent Document 1: Jpn. Pat. Appln. Laid-Open Publication No. 2004-234528). Further, methods of creating a software verification model necessary for executing a process of cooperative verification of hardware/software to be installed in a semiconductor device that can maintain the accuracy level by optimizing the technique of adding a budget process and also improve the performance are disclosed (refer to, e.g., Patent Document 2: Jpn. Pat. Appln. Laid-Open Publication No. 2005-293219).

However, all the software including the target OS needs to be rewritten in the C language to execute a native code simulation.

Additionally, the above-described stack register is not modeled in native code simulators. Therefore, the target OS cannot preserve and restore the context of each task so that, when it executes a multitask, the simulation engine and the target OS need to cooperate tightly to manage the task. The target OS is primarily responsible for management of a task on the target OS. The target OS should operate on a virtual CPU that the simulation engine provides and a task should be executed under the management of the target OS. When the simulation engine and the target OS cooperate tightly to manage a task, the proper hierarchy is not structurally consistent so that the simulation engine needs to be provided with a process for each type of target OS.

SUMMARY OF THE INVENTION

In view of the above-identified problems, it is therefore an object of the present invention to provide a simulation apparatus, a virtualization program and a virtualization method that can make a native code simulator capable of executing a native code simulation of a task on a multitask OS by allowing the target OS to possess a stack region for each task on the target OS and making it capable of operating for context switching at the timing of task switching.

In an aspect of the present invention, the above object is achieved by providing a virtualization program that causes a computer to execute a process, including: creating a stack region that stores function call information (Call Stack) with a LIFO (last in first out) structure in the order of functions to be called sequentially by each of tasks generated on a target OS, or a subject of simulation, a register preserving region that stores register contents at the last interruption of execution of each of the tasks on a task by task basis as most updated register information and a task state storing region (task control block: TCB) that stores the state information showing the state of each of the tasks on a task by task basis at each time of starting each of the tasks; storing the register contents at the time of calling the function at least immediately preceding the task called last time by the task being executed in the register preserving region as the most updated register information and also storing the state information showing the state of the task being executed in the task state storing region; and switching from the task being executed to the standing by task according to the most updated register information and the state information on the standing by task to be executed next for a native code simulation of the target OS adapted to execute a multitask process.

Preferably, in the virtualization program according to the present invention as defined above, the switching switches the task being executed on the target OS in the native code simulation by storing the register contents in a stack register of a host CPU according to the most updated register information on the standing by task.

Preferably, in the virtualization program according to the present invention as defined above, the storing in the register preserving region stores the value stored in a predetermined register of the host CPU as the most updated register information on the task being executed.

Preferably, in the virtualization program according to the present invention as defined above, the switching switches the task being executed by storing the most updated register information of the standing by task in the predetermined register of the host CPU.

In another aspect of the present invention, there is provided a simulation apparatus including: a context creating section that creates a stack region for storing function call information (Call Stack) with a LIFO (last in first out) structure in the order of functions to be called sequentially by each of tasks generated on a target OS, or a subject of simulation, a register preserving region for storing register contents at the last interruption of execution of each of the tasks on a task by task basis as most updated register information and a task state storing region (task control block: TCB) for storing the state information showing the state of each of the tasks on a task by task basis at each time of starting each of the tasks; a context storing section that stores the register contents at the time of calling the function at least immediately preceding the task called last time by the task being executed in the register preserving region as the most updated register information and also storing the state information showing the state of the task being executed in the task state storing region; and a task switching section that switches from the task being executed to the standing by task according to the most updated register information and the state information on the standing by task to be executed next for a native code simulation of the target OS adapted to execute a multitask process.

Preferably, in the simulation apparatus according to the present invention as defined above, the task switching section switches the task being executed on the target OS in the native code simulation by storing the register contents in a stack register of a host CPU according to the most updated register information on the standing by task.

Preferably, in the simulation apparatus according to the present invention as defined above, the context storing section stores the value stored in a predetermined register of the host CPU in the register preserving region as the most updated register information on the task being executed.

Preferably, in the simulation apparatus according to the present invention as defined above, the task switching section switches the task being executed by storing the most updated register information of the standing by task in the predetermined register of the host CPU.

In still another aspect of the present invention, there is provided a virtualization method including: creating a stack region that stores function call information (Call Stack) with a LIFO (last in first out) structure in the order of functions to be called sequentially by each of tasks generated on a target OS, or a subject of simulation, a register preserving region that stores the register contents at the last interruption of execution of each of the tasks on a task by task basis as most updated register information and a task state storing region (task control block: TCB) that stores the state information showing the state of each of the tasks on a task by task basis at each time of starting each of the tasks; storing the register contents at the time of calling the function at least immediately preceding the task called last time by the task being executed in the register preserving region as the most updated register information and also storing the state information showing the state of the task being executed in the task state storing region; and switching from the task being executed to the standing by task according to the most updated register information and the state information on the standing by task to be executed next for a native code simulation of the target OS adapted to execute a multitask process.

Preferably, in the virtualization method according to the present invention as defined above, the switching switches the task being executed on the target OS in the native code simulation by storing the register contents in a stack register of a host CPU according to the most updated register information on the standing by task.

Preferably, in the virtualization method according to the present invention as defined above, the storing in the register preserving region stores the value stored in a predetermined register of the host CPU as the most updated register information on the task being executed.

Preferably, in the virtualization method according to the present invention as defined above, the switching switches the task being executed by storing the most updated register information of the standing by task in the predetermined register of the host CPU.

Thus, according to the present invention, a plurality of tasks can be switched to execute a simulation at high speed for an OS adapted to execute a multitask process.

DETAILED DESCRIPTION OF THE PREFERRED EMBODIMENTS

Figure 1:
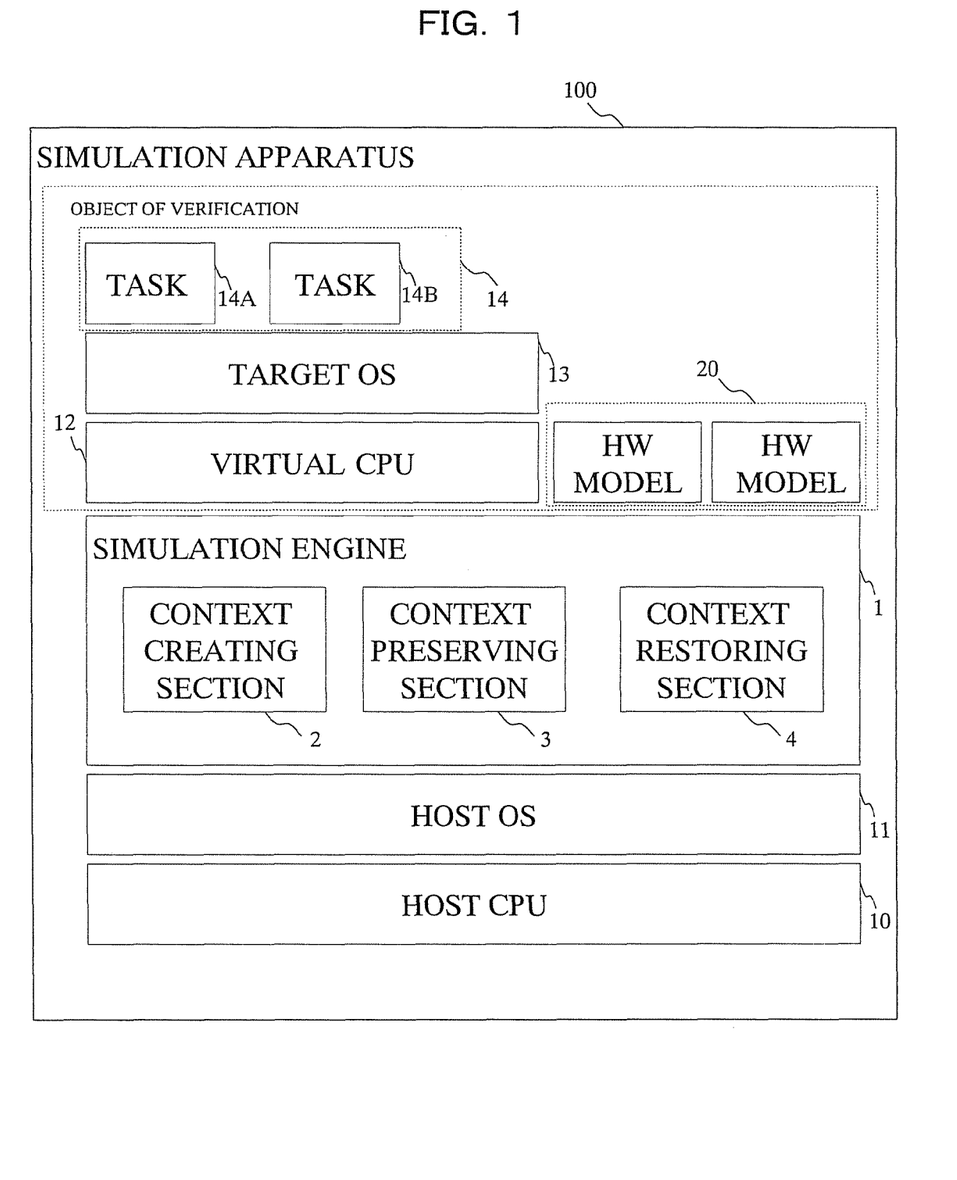
FIG. 1 is a schematic block diagram of an embodiment of simulation apparatus according to the present invention, showing the configuration thereof.

Now, an embodiment of simulation apparatus according to the present invention will be described by referring to FIG. 1, that illustrates the configuration of the apparatus.

A simulation apparatus 100 has a host CPU 10 (Central Processing Unit), a host OS 11 (Operating System), a simulation engine 1, a virtual CPU 12, a target OS 13, a task 14A, another task 14B (both or either of the tasks will be generically referred to as task 14), an HW model 20 (Hardware).

The host CPU 10 is a processing unit installed as hardware according to the predetermined architecture of the simulation apparatus 100 and host OS 11 is an OS that operates on the architecture of the host CPU 10.

The simulation engine 1 is a virtual program that provides an excitation environment for the virtual CPU 12 and the HW model 20 and executes a simulation of the software and the hardware, adjusting the timing of scheduling each model.

The virtual CPU 12 simulates the operation of the target CPU on the host OS 11. Assume that the execution mode in which the virtual CPU 12 executes a task is always a same privileged mode in this embodiment. While the stack register is not modeled in a native code simulator, the stack register of the virtual CPU 12 maps the stack register of the host CPU 10. In other words, as the target OS 12 reads/writes the stack register, the stack register of the host CPU 10 is read/written.

The target OS 13 is an OS that can execute a multitask process to be executed on the virtual CPU 12. It is assumed that the target OS 13 of this embodiment is not a multiple virtual memory OS but a monolithic space OS.

The task 14 is a user program for executing a predetermined process on the target OS 13. The task 14 is a program generated (compiled) by means of a native code conforming to the architecture of the host CPU 10.

The HW model 20 is typically software of modeling the operation of a predetermined peripheral device such as a CCD camera, a scanner or the like.

The simulation apparatus 100 of this embodiment is designed to verify the operation of the hardware/software environment of the above-described arrangement of the virtual CPU 12, the target OS 13, the task 14 and the HW model 20. Note that the entire modeled environment may be referred to as object of verification whenever necessary.

The simulation engine 1 is provided with APIs for processes of creation, save (preservation), restoration and erasure of the context of the task. Its function is realized as each API is called by the target OS 13. A specific stack region is assigned to each task by partly altering the code so as to call the APIs of the simulation engine 1 when porting the target OS 13. When switching the task, the context can be switched as the stack region is switched. Since the native code is directly executed for the task 14, the simulation engine 1 is made to have a process of context operation API for each of the host CPU 10 and the host OS 11 it supports by making the internal structure of the stack region same as that of the stack region that the host OS 11 uses on the host CPU 10.

Additionally, the simulation engine 1 is provided with a context creating section 2, a context preserving section 3 (context storing section) and a context restoring section 4 (task switching section) so as to make it possible to execute the task 14A and the task 14B in parallel. In the following description of the context creating section 2, the context preserving section 3 and the context restoring section 4, it is assumed that the task 14A is being executed and the task 14B is to be executed next (as standing by task) so that the task being executed is switched from the task 14A to the task 14B.

The context creating section 2 generates a stack region for storing function call information (Call stack) with a LIFO (last in first out) structure in the order of the functions to be called sequentially by each of the tasks 14A and 14B and a register preserving region for storing the most updated register information on the tasks 14. It also generates a task state storing region (task control block: TCB) for storing the task state information showing the state of each of the tasks 14 on a task by task basis. The TCB may have a register preserving region in the inside thereof as in the case of this embodiment. In such a case, both a register preserving region and a task state information region exist in the TCB.

The context preserving section 3 stores the register contents at the time when the task 14A being executed called the function last time by the task being executed in the TCB of the task 14A as the most updated register information. It also stores the task state information showing the state of the task 14A being executed in the TCB of the task 14A. The context preserving section 3 executes a similar process for the task 14B.

The context restoring section 4 switches from the task 14A being executed to the standing by task 14B to be executed next according to the most updated register information and the task state information on the standing by task 14B. The context restoring section 4 executes a similar process for switching from the task 14B to the task 14A.

Task switching is realized on the target OS 13 adapted to execute a multitask process as the process of the context preserving section 3 and that of the context restoring section 4 are executed at a predetermined timing (e.g., at the time of occurrence of an interrupt by the Interrupt Routine Scheduler (IRS) of the target OS 13 or according to a directive for an interrupt issued in response to a system call by the user).

Now, the process of the simulation apparatus 100 of this embodiment will be described below by referring to the flowchart of FIG. 2. Note that, the task 14A creates the task 14B, and the task 14A is switched to the task 14B in the following description.

When a task creation request is issued from the task 14A for the task 14B, the context creating section 2 generates a TCB and a stack region that correspond to the task 14B. It also generates a root frame (a management region where the information necessary for starting execution of a task) of the stack region it generates (Step S1).

Now, the structure of the functions of the task 14A, the stack region of the task 14A and the task 14B and the TCB will be described below by referring to FIG. 3.

Figure 3:
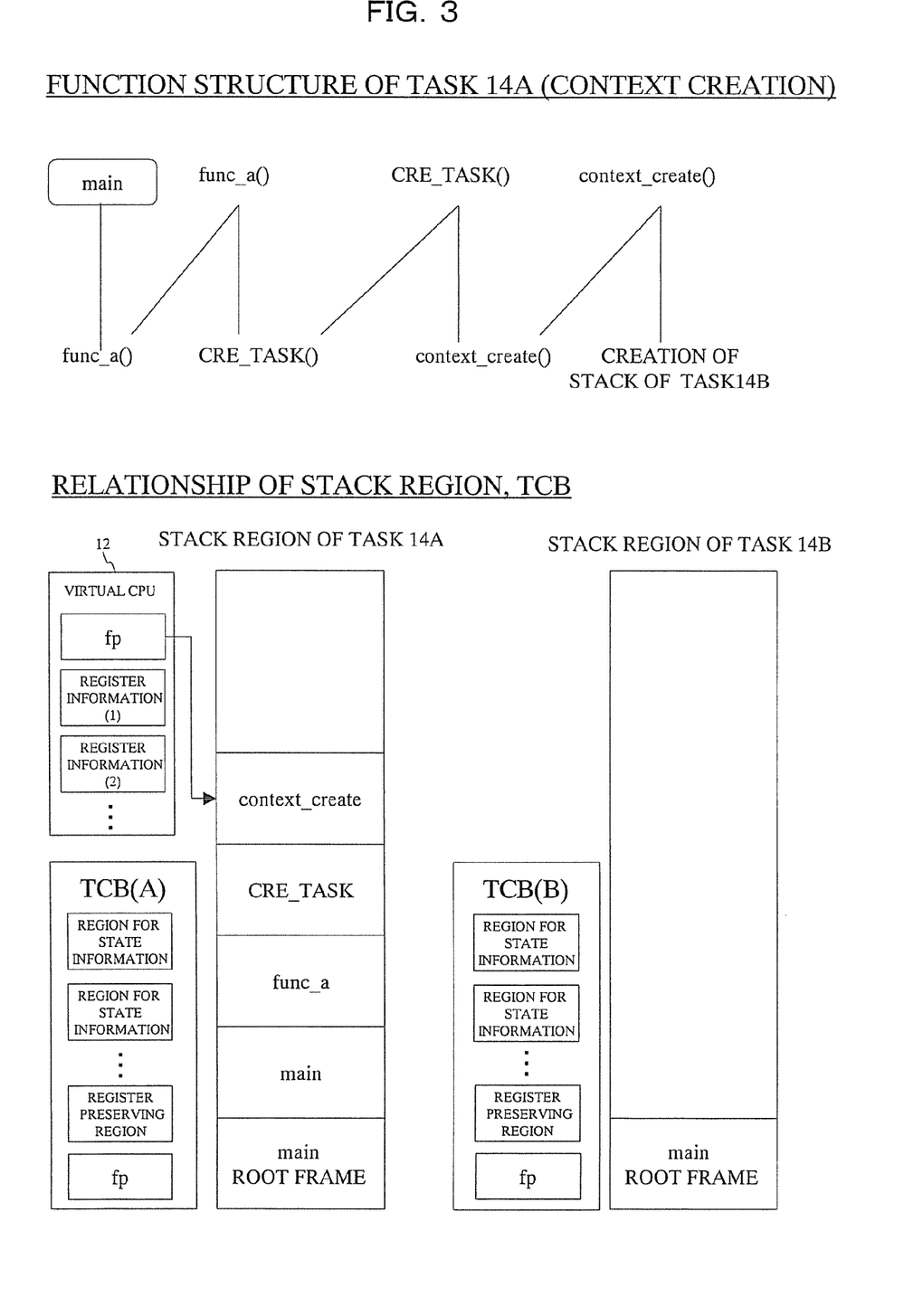
FIG. 3 is a schematic illustration of the structure of the function and that of the stack region of a task in a context creation process of the embodiment.

The function call of the task 14A at the time of creating a context is a call for CRE-TASK ( ) that is the API for creating the task prepared by the target OS from the function fun_a ( ), which func_a ( ) is a user program while main ( ) is a main function as shown in the "the function structure (context creation) of the task 14A" illustrated in FIG. 3. The structure also includes context_create ( ) that is a function prepared by the simulation engine 1 in CRE_TASK ( ) and has a functional feature of the context creating section 2.

Pieces of function call information are stored with a LIFO stack structure in the stack region that is created as CRE_TASK ( ), which is a task creating functional feature of the target OS, is called as shown in the "relationship of stack region and TCB" in FIG. 3. For the above-described task 14A, the root frame of the stack region is created at the time of starting the task and main ( ) frame, func_a ( ) frame, CRE_TASK ( ) frame, context_create ( ) frame (frame: a unit for storing function call information) are stacked in the stack region in the order of the functions that are called sequentially as the process of executing the task 14A proceeds.

The task 14B is created by CRE_TASK ( ) that is a task creating function and the necessary settings are provided by context_create ( ) of the context creating section 2. The process of CRE_TASK ( ) and that of context_create ( ) that is called in the inside thereof will be described below.

As the task 14B is started, CRE_TASK ( ) prepares TCB (TCB that corresponds to task 14A is notated as TCB (A) and TCB that corresponds to task 14B is notated as TCB (B) hereinafter) and defines the initial values of the information relating to the task (the initial value of the register, the initial value of the task state information). Additionally, CRE_TASK ( ) assigns the address space (including a stack region) for arranging the program to be executed as the started task. CRE_TASK ( ) of this embodiment cuts and divides the address space of the real memory and assigns it as stack region because the target OS 13 is a monolithic space OS. On the other hand, CRE_TASK ( ) prepares virtual space control information such as a page table when the target OS is a virtual memory OS.

On the other hand, context_create ( ) sets in position the information necessary at the time of starting execution of the started task (e.g., the environment variable of the task, the start address of the main function, etc.) in the route frame. Additionally, it registers the prepared TCB in a TCB queue (such as task ready queue) that the target OS 13 manages.

In this way, the region for storing the context of the task 14B is prepared by CRE_TASK ( ) that realizes such as task creating functional feature and context_create ( ) that is called in the inside of the former. The prepared stack region may be prepared by dividing the stack region that the host OS 11 assigned to the thread, which is the object of verification, or by using the region that is acquired by the memory region assigning service of the host OS 11 such as memory allocation function (malloc function).

As the context creation process is completed, context_create ( ) ends (and the context_create ( ) calling frame is released from the stack region) and CRE_TASK ( ) ends (and CRE_TASK ( ) calling frame is released form the stack region).

While a task creation request is made for the task 14B by the task 14A and the task 14A dynamically creates the task 14B in the above description, it may alternatively be so arranged that the target OS 13 statically creates the task 14B according to the OS configuration information.

Figure 2:
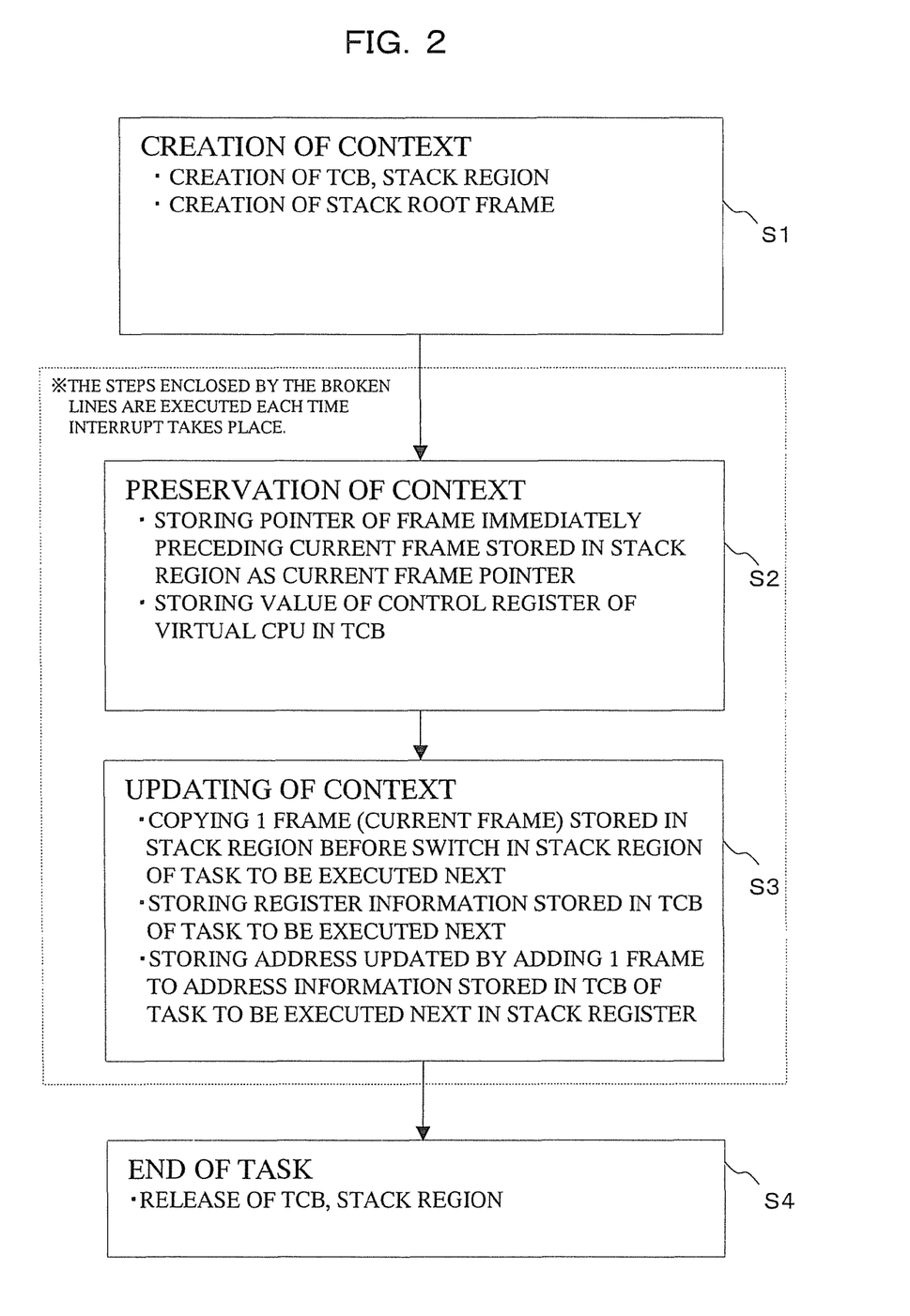
FIG. 2 is a flowchart of an exemplar process of the simulation apparatus of the embodiment.

Now, let's get back to the flowchart of FIG. 2. The task switching process for executing the task 14A and the task 14B in parallel after the creation of the task 14B will be described below.

The context preserving section 3 stores the frame preceding the current frame by a frame that is stored in the stack of the host CPU 10, in the TCB as current frame pointer. Additionally, the context preserving section 3 stores the value that is stored in the PSR (the register storing the value showing the task state), which is the control resistor of the virtual CPU, in the TCB (Step S2).

The process that is executed by the context preserving section 3 will be described below in terms of the task 14A by referring to FIG. 4.

Figure 4:
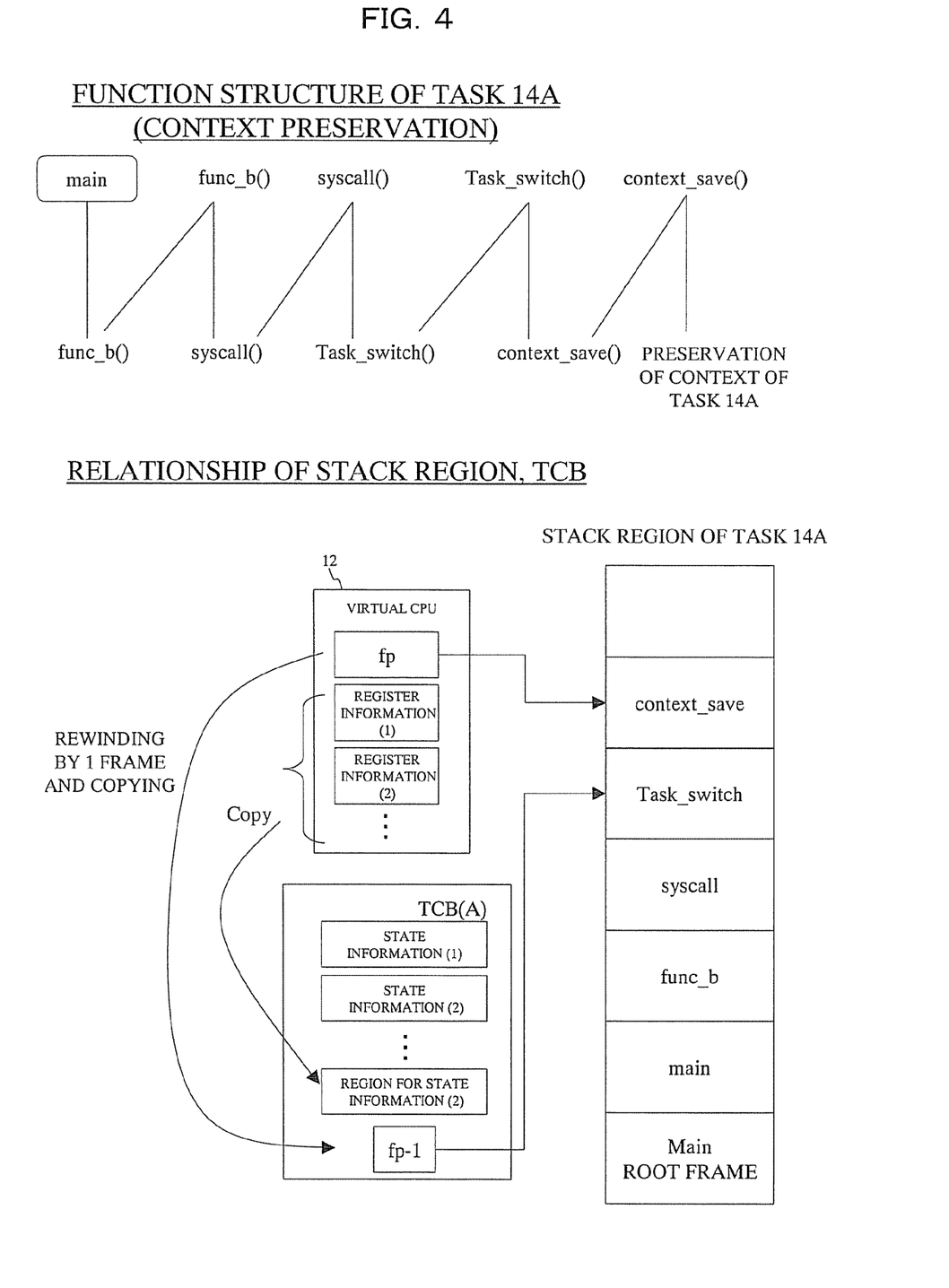
FIG. 4 is a schematic illustration of the structure of the function and that of the stack region of a task in a context preservation process of the embodiment.

Assume that the function called by the task 14A when preserving a context in the TCB has "the function structure (context preservation) of the task 14A" as illustrated in FIG. 4A. More specifically, main ( ) is a main function and func_b ( ) that is a function of the user program is there, while a system call that is provided by the target OS 13 is made from the inside of the func_b ( ) (syscall ( ) function is called). Additionally, task switching function (Task_switch ( )) is called for the purpose of task switching in the system call and context_save ( ) that is a functional feature of the context preserving section 3 is called as an internal function of Task_switch ( )).

Under the above-described circumstances, the virtual CPU 12 is currently executing context_save ( ) and the stack register of the virtual CPU 12 stores the address of the context_save ( ) frame (notated as fp in FIG. 4). Now, context_save ( ) stores the address of the frame of the function preceding the frame of its own context_save ( ) in the TCB (A).

Further, context_save ( ) preserves the register information currently stored in the control register of the virtual CPU 12, in the register preservation region of the task 14A, thereby storing in the TCB (A).

As the above-described process is executed and context_save ( ) ends, the frame of context_save ( ) is also released.

In this way, context_save ( ) that is a functional feature of the context preserving section 3 stores the address of the function call information on the function that called context_save ( ) in the TCB (A) as current frame pointer and stores the register information that is currently stored in the control register of the virtual CPU 12 in the TCB (A). Thus, when the task 14A is switched to the task 14B sometime later and subsequently the task 14B is switched to the task 14A again, the task 14A can continue the execution of the process in the state before the switches.

Now, let's get back to the flowchart of FIG. 2 once again for the process that comes after the context of the task 14A is preserved in the TCB (A).

The context restoring section 4 copies the call frame (current frame) of the function that is currently being executed out of the function call information stored in the stack region of the task 14A, which is being executed, in the stack region of the task 14B (the standing by task to be executed next). The context restoring section 4 stores the register information stored in the TCB (B) in the control register of the virtual CPU 12 and it also stores the address updated by incrementing the address stored in the TCB (B) by a frame in the stack register of the virtual CPU 12 as current frame pointer (Step S3).

The process that the context restoring section 4 executes will be described below by referring to FIG. 5.

Figure 5:
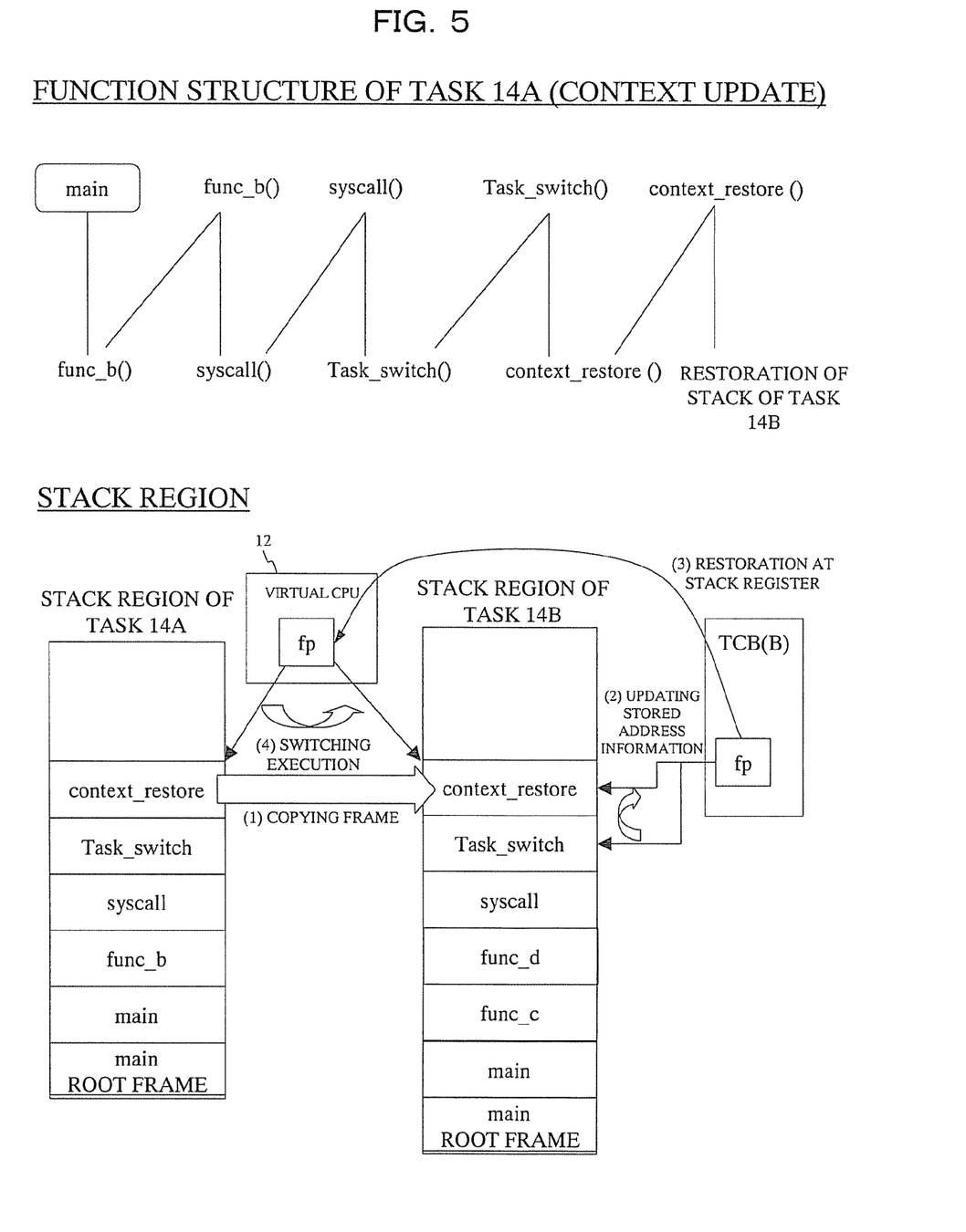
FIG. 5 is a schematic illustration of the structure of the function and that of the stack region of a task in a context restoration process of the embodiment.

FIG. 5 illustrates a state where the current task 14A is being executed and the above-described process (context_save ( )) of the context processing section 3 has ended and context_restore ( ) that is the functional feature of the context restoring section 4 is called.

Firstly, as context_restore ( ) is called by Task_switch ( ) in the task 14A, context_restore ( ) copies the call frame (a frame) of its own context_restore ( ) function on the stack region of the task 14B. Subsequently, context_restore ( ) updates the address stored in the TCB (B) by incrementing it by the size of the call frame of its own context_restore ( ) function it has copied. In other words, the context_restore ( ) updates the stack frame pointer of TCB (B) from the address of the call frame of the Task_switch ( ) function to the address of the call frame of the context_restore ( ) function.

Thereafter, context_restore ( ) stores the contents of the updated pointer in the stack register of the virtual CPU 12 and it also stores the register information stored in the register preserving region in the control register of the virtual CPU 12 (note that the register information is not shown in FIG. 5).

As a result, the virtual CPU 12 simply executes the process on the address stored in its own stack register (namely context_restore ( ) stacked in the stack region of the task 14B) without realizing that the task is switched.

Thereafter, as the series of switching processes have been completed, the process of context_restore ( ) ends (and hence the context_restore ( ) frame is released) and the process of Task_switch ( ) of the task 14B also ends (and hence Task_switch ( ) frame is released). Additionally, as the system call (syscall ( )) of the task 14B ends (and hence the syscall ( ) frame is released), the task 14B continues the execution of the process before it was put into the standby state (func_d ( ) that is a user function in FIG. 5).

As the above-described process of context_save ( ) or that of context_restore ( ) is called from Task_switch ( ) at the timing of generation of an interrupt by the interrupt scheduler of the target OS 13 or at the timing of generation of a system call (syscall ( )), the task 14A or the task 14B is switched to the other.

As the task 14B gets into a state of being executed and subsequently the task 14B is switched to the task 14A, context_save ( ) is called during the execution process of the task 14B and the process of preserving the current control register and the stack pointer (updated by decrementing by a frame) of the virtual CPU 12 is executed. Subsequently, as context_restore ( ) is called for the process of the task 14B, context_restore ( ) copies the call frame of its own context_restore ( ) function in the task 14A and updates the stack frame pointer stored in the TCB (A) by incrementing it by a frame (by the size of the call frame of the context_restore ( ) function) so as to store the contents of the updated stack frame pointer in the stack register and also store the state information stored in the TCB (A) in the control register. In this way, the task 14A can continue its own process of context_restore ( ).

Now, let's get back to the flowchart of FIG. 2 once again. The end of the task will be described below in terms of the task 14A. As the functions in the task 14A are ended on a one by one basis (the frames of the stack regions are released on a one by one basis) and the last main ( ) ends, the stack region assigned for the task 14A with the root frame is released to end the task 14A (Step S4).

While contexts of two tasks are created and the two tasks are switch from one to the other in the above description of the embodiment, more tasks can be created and switched from one to another according to the present invention.

While the context preserving section 3 stores the address stored in the stack region and updated by decrementing by a frame of the function executed last in the TCB as storage address information and the context restoring section 4 stores the address updated by incrementing by a copied frame for the storage address information in the stack register of the virtual CPU 12 in the above-described embodiment, the number of frames of an increment or a decrement, which may be equal to nil, may vary depending on the program location where a task switch takes place. In the above description of the embodiment, it is assumed that a task switch takes place in the Task_switch ( ) function.

While the virtual CPU 12 executes a task is always in a same privileged mode in the above description of the embodiment, only the interrupt scheduler may be handled in another privileged mode. If such is a case, a stack region may be prepared for an interrupt process at the time of starting the target OS 13 and a switch to the stack for an interrupt process may be made when the interrupt scheduler schedules an interrupt handler.

While the target OS 13 is for a single space (monolithic space OS) in the above description of the embodiment, task specific spaces of a plurality of tasks cannot be referred to and operated simultaneously in the case of a multiple virtual memory OS. In other words, a stack frame copying operation cannot be realized in a multiple virtual memory by direct copying unlike the above-described instance of the embodiment. If such is a case, the stack frame is copied once to a region that is common to tasks such as the system region of the target OS 13 with the context of the originating task and the context of the task is switched to copy the stack frame to a stack of the destination task. In this way, context switching equivalent to that of the above-described embodiment can be realized. In other words, the present invention is applicable to multiple virtual memory OSs.

While the virtual CPU 12 executes a task is always in a same privileged mode in the above description of the embodiment, there are a number of different modes provided for execution of tasks such as user modes, privileged modes and exception modes for the purpose of system protection and it is a general practice to switch the current execution mode by providing a mechanism for switching such as bank switching.

When switching the current execution mode, the current frame pointer of the stack region for the execution mode before the switch is stored in the frame of the stack region for the execution mode after the switch. Then, as a result, the current frame pointer at the time of switching the execution mode can be restored when returning to the preceding execution mode from the current execution mode.

The virtual CPU 12, the target OS 13 and the task 14 are a single execution unit from the viewpoint of the simulation engine 1 of this embodiment so that the timing of switching from the task 14A to the task 14B and the task switching conditions are determined only by the target OS 13 and are transparent to the simulation engine 1. Therefore, if the task switching algorithm of the target OS is altered, the simulation engine 1 is not required to be altered.

While the virtualization program is installed in advance in the inside of the simulation apparatus of this embodiment in the above description, a virtualization program according to the present invention may be stored in a storage medium. Storage mediums that can be used for the purpose of the present invention include all the mediums that can store the virtualization program so as to be readable relative to the computer of the simulation apparatus. Such mediums include those that can be disconnectably connected to the simulation apparatus such as magnetic tapes, magnetic disks (floppy disks, hard disk drives, etc.), optical disks (CD-ROMs, DVDs, etc.), magneto-optical disks (MDs, etc.), flash memories and so on and those that can receive the virtualization program transmitted by way of a network.

What is claimed is:

1. A non-transitory computer-readable medium storing a program that causes a host central processing unit to execute a process for a native code simulation in a host operating system, the process comprising:

in response to starting each of a plurality of tasks executed in a target operating system with multitasking, creating a stack region in the host central processing unit, a register preserving region in the target operating system, and a task state storing region in the target operating system, the native code simulation being a simulation of the target operating system and the plurality of tasks, the stack region storing function call information for each of the plurality of tasks with a last in first out structure in the order of functions to be called sequentially by each of the plurality of tasks, the register preserving region storing most updated register information for each of the plurality of tasks, the most updated register information being a register contents at the last interruption of execution of each of the plurality of tasks, the task state storing region storing a state information for each of the plurality of tasks, the state information showing a state of each of the plurality of tasks;

in response to a transition of a state of any of the plurality of tasks from an execution state to a standby state or from the standby state to the execution state by occurrence of an interrupt or a directive for an interrupt, storing in the register preserving region the most updated register information which is a register contents of a time that a task in the execution state calls a function before the last time that the task calls a function, and also storing in the task state storing region a state information showing a state of the task in the execution state; and in response to the transition, switching from the task in the execution state to a task in the standby state of the plurality of tasks by storing in the stack region the most updated register information in the task in the standby state to be executed next, wherein the storing of the most updated register information stores in the register preserving region a value stored in a predetermined register in the host central processing unit as the most updated register information of the task in the execution state, and the predetermined register is provided for each of the plurality of tasks and wherein the switching switches the task in the execution state, by storing in the predetermined register the most updated register information of the task in the standby state.

2. A simulation apparatus comprising:

a host central processing unit, the host central processing unit is programmed to execute a process for a native code simulation in a host operating system, the process comprising:

in response to starting each of a plurality of tasks executed in a target operating system with multitasking, creating a stack region in the host central processing unit, a register preserving region in the target operating system, and a task state storing region in the target operating system, the native code simulation being a simulation of the target operating system and the plurality of tasks, the stack region storing function call information for each of the plurality of tasks with a last in first out structure in the order of functions to be called sequentially by each of the plurality of tasks, the register preserving region storing most updated register information for each of the plurality of tasks, the most updated register information being a register contents at the last interruption of execution of each of the plurality of tasks, the task state storing region storing a state information for each of the plurality of tasks, the state information showing a state of each of the plurality of tasks;

in response to a transition of a state of any of the plurality of tasks from an execution state to a standby state or from the standby state to the execution state by occurrence of an interrupt or a directive for an interrupt, storing in the register preserving region the most updated register information which is a register contents of a time that a task in the execution state calls a function before the last time that the task calls a function, and also storing in the task state storing region a state information showing a state of the task in the execution state; and in response to the transition, switching from the task in the execution state to a task in the standby state of the plurality of tasks by storing in the stack region the most updated register information in the task in the standby state to be executed next, wherein the storing of the most updated register information stores in the register preserving region a value stored in a predetermined register in the host central processing unit as the most updated register information of the task in the execution state, and the predetermined register is provided for each of the plurality of tasks and wherein the switching switches the task in the execution state, by storing in the predetermined register the most updated register information of the task in the standby state.

3. A virtualization method executing a process for a native code simulation in a host operating system, the process comprising:

in response to starting each of a plurality of tasks executed in a target operating system with multitasking, creating a stack region in a host central processing unit, a register preserving region in the target operating system, and a task state storing region in the target operating system, the native code simulation being a simulation of the target operating system and the plurality of tasks, the stack region storing function call information for each of the plurality of tasks with a last in first out structure in the order of functions to be called sequentially by each of the plurality of tasks, the register preserving region storing most updated register information for each the plurality of tasks, the most updated register information being a register contents at the last interruption of execution of each of the plurality of tasks, the task state storing region storing a state information for each of the plurality of tasks, the state information showing a state of each of the plurality of tasks;

in response to a transition of a state of any of the plurality of tasks from an execution state to a standby state or from the standby state to the execution state by occurrence of an interrupt or a directive for an interrupt, storing in the register preserving region the most updated register information which is a register contents of a time that a task in the execution state calls a function before the last time that the task calls a function, and also storing in the task state storing region a state information showing a state of the task in the execution state; and in response to the transition, switching from the task in the execution state to a task in the standby state of the plurality of tasks by storing in the stack region the most updated register information in the task in the standby state to be executed next, wherein the storing of the most updated register information stores in the register preserving region a value stored in a predetermined register in the host central processing unit as the most updated register information of the task in the execution state, and the predetermined register is provided for each of the plurality of tasks and wherein the switching switches the task in the execution state, by storing in the predetermined register the most updated register information of the task in the standby state.

\* \* \* \* \*